Sept. 12, 1967  G. N. CATRAVAS  3,341,299
CHROMATOGRAPHY ANALYSIS APPARATUS AND METHOD
Filed Aug. 14, 1964  2 Sheets-Sheet 1
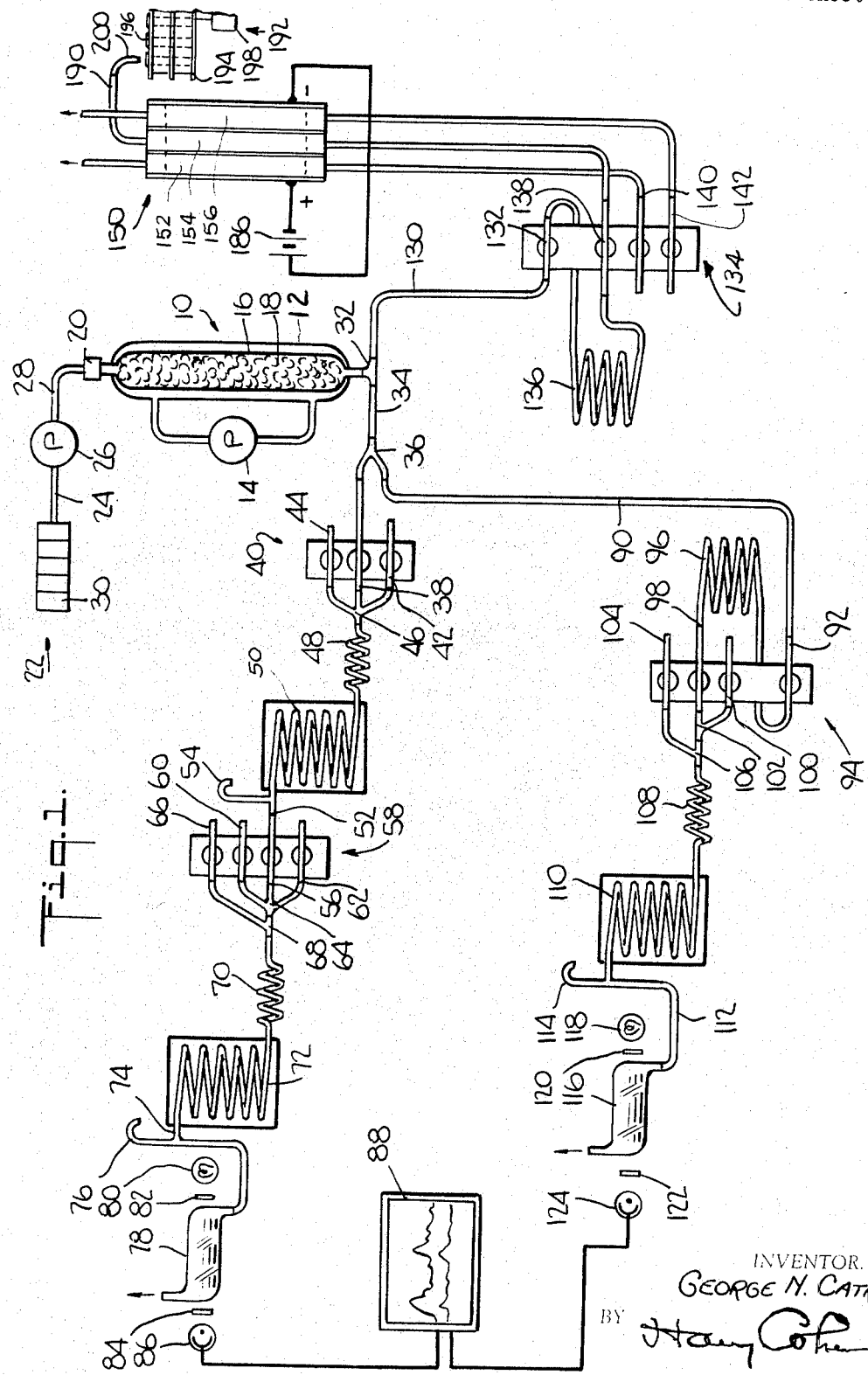
INVENTOR.
GEORGE N. CATRAVAS
BY Harry Cohen
ATTORNEY

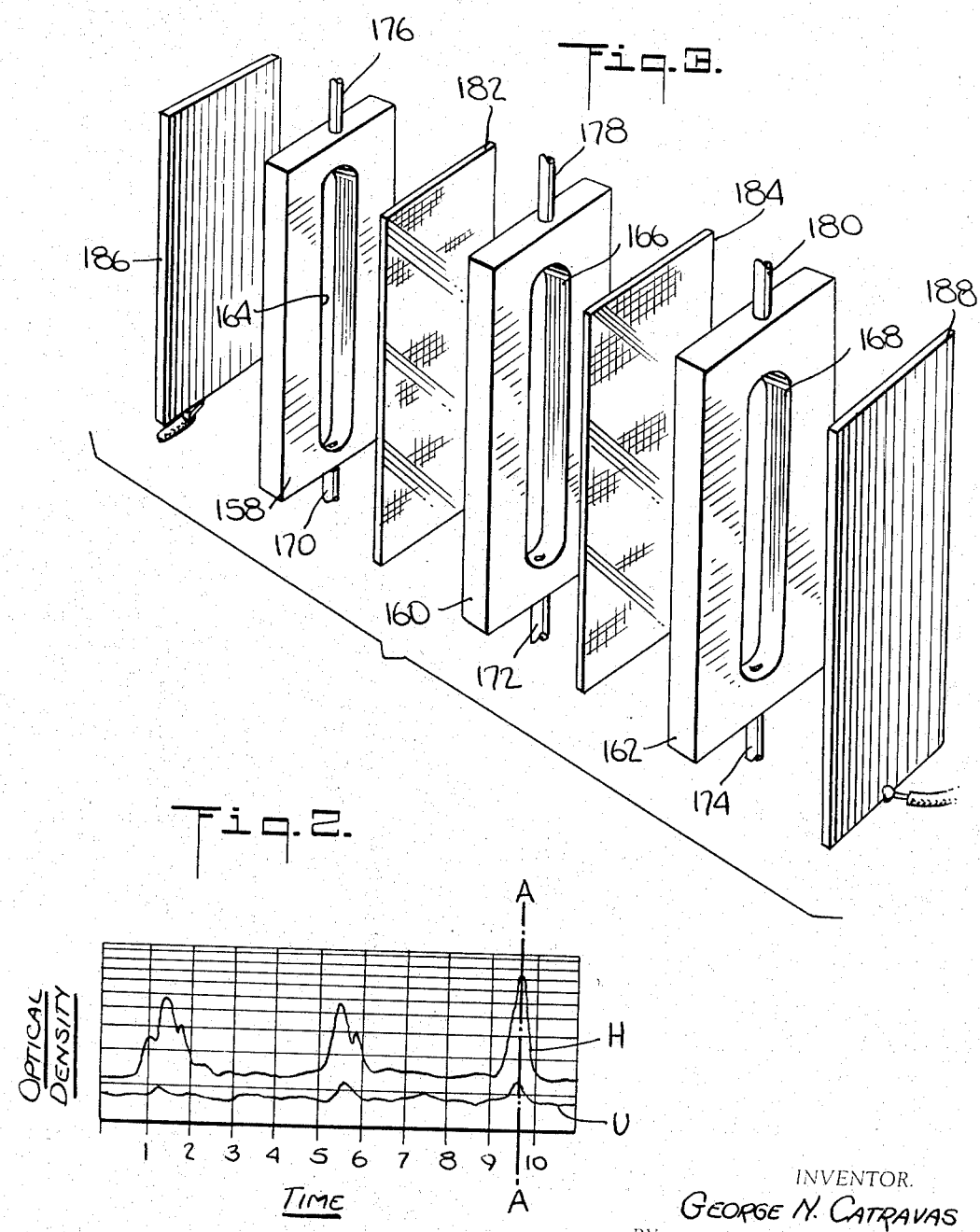

United States Patent Office 3,341,299
Patented Sept. 12, 1967

3,341,299
CHROMATOGRAPHY ANALYSIS APPARATUS
AND METHOD
George N. Catravas, Yonkers, N.Y., assignor to Technicon Corporation, a corporation of New York
Filed Aug. 14, 1964, Ser. No. 389,728
12 Claims. (Cl. 23—230)

This invention relates to chromatography and more particularly to the analysis of a continuous flow of effluent from a chromatographic separation column.

It is known to separate peptides by the use of a chromatographic column of ion-exchange resin wherein the effluent from the column is stored in containers of relatively small volume, whereby each fraction of the effluent is separated from the preceding and succeeding fractions. Subsequently, the contents of each container may be analyzed.

One object of this invention is the provision of a method and apparatus for continuously analyzing the column effluent to discover peptides which do not significantly react with ninhydrin.

In this connection, a feature of this invention is the provision of an analysis apparatus including means for continuously analyzing the column effluent for peptides, and means for continuously hydrolyzing and analyzing the column effluent for amino acids in phase with the analysis of the non-hydrolyzed effluent, and means for recording the results of these analyses in phase with each other and the passage of the related effluent to the particular storage receptacles.

Another object is the provision of a method and apparatus for continuously analyzing the column effluent in correlation to its passage to storage in the fraction containers, and to provide a permanent record of this correlated analysis.

Another object of this invention is the provision of a method and an apparatus for continuously analyzing the column effluent to determine the size of the peptide contained in the instant effluent.

Still another object of this invention is the provision of a method and an apparatus for continuously analyzing the column effluent to determine the number of amino acids in the peptide contained in successive fractions of the effluent.

Yet another object of this invention is the provision of a method for continuously analyzing the column effluent without destruction of amino acids contained therein.

The above, and other objects, features and advantages of the invention which will hereinafter appear will be fully understood from the following description considered in connection with the accompanying drawings in which:

FIG. 1 is a diagrammatic representation of an apparatus embodying this invention;

FIG. 2 is a graph showing the analysis of the effluent plotted concurrently with the analysis of the hydrolyzed effluent; and FIG. 3 is a perspective exploded view of a continuous flow desalting chamber.

Turning now to the drawings, FIG. 1 shows a chromatographic column 10 having an outer tube 12 which is coupled to an adjustable temperature water circulation system 14. An inner tube 16 is packed with a suitable particulate ion-exchange resin 18 for the separation of peptides. The peptides may result from the hydrolysis of a protein. The top of the inner tube 16 is coupled to an inlet valve 20 which will admit the insertion of the mixture of peptides to be separated into the top of the inner tube 16. This valve may advantageously be of the type shown in the Winter and Catravas U.S. patent application S.N. 358,198, filed Apr. 8, 1964. The outlet of a variable gradient buffer solution supply device 22 is coupled via a conduit 24 to the input of a positive displacement pump 26. The output of the pump is coupled via a conduit 28 to the eluent input of the valve 20. The eluent supply device 22 may advantageously be of the type shown in the Isreeli U.S. Patent No. 3,137,480, issued on June 16, 1964. Briefly described, this device comprises a series of chambers, indicated at 30, which are in fluid flow communication with each other and which respectively contain the eluting liquid or buffer of different concentrations and pH levels. The buffer may be sodium citrate-acetate. The buffer flows from one chamber to the adjacent chambers and thence through the outlet from which it is pumped by the pump 26 through the column 10 at a constant rate regardless of resistant pressure. The effluent from the column passes to a T fitting 32 which directs a portion to the left to the analysis apparatus and a portion to the right to the desalting and storage apparatus.

During the flow of the eluent downwardly through the inner tube 16, the peptides absorbed by the resin in the tube are stripped and discharged in succession through the outlet T fitting 32 at the bottom of the tube 16.

The left outlet of the fitting 32 is coupled by a conduit 34 to the input of a Y fitting 36. One outlet of this fitting is coupled to a pump tube 38 of a proportioning pump 40. This proportioning pump and the others hereinafter mentioned may advantageously be of the type shown in the Isreeli and Ferrari U.S. Patent No. 2,935,028, issued May 3, 1960. The pump 40 also includes a pump tube 42 coupled to a supply of sodium hydroxide or other suitable alkali, not shown, for hydrolyzing the peptides, and a pump tube 44 coupled to a supply of nitrogen, not shown.

The hydrolyzing apparatus is similar to that which is shown in my copending application for U.S. Patent, S.N. 314,812, filed Oct. 8, 1963. The pump tubes 38, 42 and 44 are joined at a fitting 46, which couples the stream of effluent and sodium hydroxide which has been segmentized by the nitrogen, to a mixing coil 48 which in turn passes the segmentized stream of intermixed effluent and sodium hydroxide to a heating coil 50. The peptide in the effluent is hydrolyzed into its constituent amino acids in the heating coil as a continuous flow and coupled by a conduit 52 which includes a gas vent 54 for venting the segments of the nitrogen from the stream, to a pump tube 56 of a proportioning pump 58. The pump also includes a pump tube 60 coupled to a supply of neutralizing acid, such as acetic acid, not shown, and a pump tube 62 coupled to a supply of nitrogen, not shown. The pump tubes 56, 60 and 62 are joined by a fitting 64. The acid neutralizes any residual alkali in the stream, while the nitrogen segmentizes the stream. The pump further includes a pump tube 66 which is coupled to a supply of ninhydrin plus hydrindantin in methyl Cellosolve. The outlet of the fitting 64 and the pump tube 66 are joined in a fitting 68 which is coupled to the inlet of a mixing coil 70, the outlet of which is coupled to the inlet of a heating coil 72. The ninhydrin oxidizes amino acids to RCHO, $NH_3$ and $CO_2$ and affords a dihydride that combines with the ammonia to produce a pigment. The density of the stream will be responsive to the quantity of ammonia available.

The use of a continuous flow of a solution of sodium hydroxide (or potassium hydroxide) permits the concentration of the solution to be kept constant. This is an advantage over a bath treatment utilizing a solution of sodium hydroxide, wherein as the batch of the solution of sodium hydroxide and the sample is heated, the water in the batch evaporates and the concentration of the solution increases, destroying the alkali sensitive amino acids in the presence of air. I have found a concentration range of 3 to 4 normal in the hydrolyzing heating coil 50 at a temperature of 100° C. to be suitable, and a concentration of 3.5 normal to be desirable. Lower concentrations are inadequately effective, while higher concentrations are destructive of the amino acids.

The outlet of the heating coil 72 is coupled by a conduit 74 having a gas vent 76 to the inlet of a flow cell 78. A light source 80, a collimating lens systems 82, and interference filter 84 and a light detector 86 are provided to determine the density of the color of the fluid in the flow cell. The output of the detector 86 is coupled to one input of a two-input recorder 88. The recorder plots the optical density of the continuously flowing fluid in the flow cell as a function of time.

The other outlet of the Y fitting 36 is coupled by a conduit 90 to a pump tube 92 of a proportioning pump 94. This pump tube is coupled to the inlet of a delay coil 96, the outlet of which is coupled to a pump tube 98 of the pump. The pump also includes a pump tube 100 coupled to a supply of nitrogen, not shown. The pump tubes 98 and 100 are joined by a fitting 102. A pump tube 104 is coupled to a supply of ninhydrin and hydrindantin in methyl Cellosolve, not shown. The outlet of the fitting 102 and the pump tube 104 are joined by a fitting 106. The nitrogen segmentized stream of effluent and the ninhydrin are passed to a mixing coil 108, the inlet of which is coupled to the outlet of the fitting 106. The outlet of the mixing coil is coupled to the inlet of a heating coil 110, the outlet of which is coupled by a conduit 112 having a gas vent 114 to the inlet of a flow cell 116. The ninhydrin reacts with the free amino group in the peptide to form a pigment. A light source 118, a collimating lense system 120, an interference filter 122 and a light detector 124 are provided for this flow cell. The output of the light detector is coupled to the second input of the recorder 88. The length of the delay coil 96 is arranged so that the flow cells 78 and 116 at any given time contain subportions of the same fraction of the effluent stream from the chromatographic column. Thus the spectograms from the two detectors 86 and 124 are in phase and the recorded curves showing the ninhydrin reaction of the hydrolyzed and unhydrolyzed subportions of the effluent may be directly compared.

FIG. 2 depicts a chart produced by the recorder 88. The abscissa is a linear time scale and the ordinate is a logarithmetric optical density scale. The lower curve U is the spectrogram provided by the unhydrolyzed effluent, while the upper curve H is the spectrogram provided by the hydrolyzed effluent. The ordinate is responsive to the quantity of the individual molecules present in the liquid in the particular flow cell. Thus, the ratio of the areas under a pair of phased peaks is indicative of the number of amino acids hydrolyzed from a peptide in the particular fraction of the effluent. If, for example, the area of the H curve peak about the ordinate A is thrice that of the area of the curve U curve peak about the ordinate A, it may be deduced that three amino acids were hydrolyzed from this peptide. However, if one or more of the amino acids contains two amino groups rather than only one, then it will appear as if it were twice as plentiful. In any case, the peptide can be readily grouped into large and small categories by inspection of the chart.

If the ordinates of both curve peaks are very high, it may be deduced that the concentration of this peptide in the effluent is high, while if the ordinates of both curve peaks are very low, it may be deduced that the concentration of this peptide is low.

In some cases it has been observed that the hydrolyzed curve will exhibit a peak having a significant ordinate, while the equivalent unhydrolyzed curve is substantially indistinguishable from the base line. This is indicative of a peptide which has a very small amount of ninhydrin positive $NH_2$ and would not be discovered in the effluent without the hydrolyzing prior to the ninhydrin reaction.

The other outlet of the T fitting 32 is coupled by a conduit 130 to a pump tube 132 of a proportioning pump 134. This pump tube is coupled to the inlet of a delay coil 136, the outlet of which is coupled to a pump tube 138. The pump tube also includes a pump tube 140 coupled to a supply of dilute sodium hydroxide, and a pump tube 142 coupled to a supply of dilute sulphuric acid, both not shown.

A continuous flow desalting column 150 includes three chambers 152, 154 and 156 which are in mutual fluid flow communication. As shown in FIG. 3, the column is formed of three dielectric plates, 158, 160, 162, each having an elongated central cavity or cut-out 164, 166, 168 respectively. The plates also have inlet tubes 170, 172, 174 respetcively, communicating with the bottoms of the cavities, and outlet tubes 176, 178, 180, respectively, communicating with the tops of the cavities. The plates may be made from a suitable transparent plastic, such as "Lucite." An anion exchange membrane 182 is sandwiched between the plates 158 and 160, and a cation exchange membrane 184 is sandwiched between the plates 160 and 162. The membranes separate the cavities 164, 166 and 168 from each other. An anode 186 is disposed adjacent the outer face of the plate 158 over the cavity 164, and a cathode 188 is disposed adjacent the outer face of the plate 162 over the cavity 168. The electrodes, plates and membranes are sandwiched together by suitable means such as machine screws or clamps, not shown, to form three chambers. A suitable source of direct current 186 is coupled across the electrodes.

The pump tube 138 is coupled to the inlet 172 to pass the effluent to the middle chamber. The pump tube 140 is coupled to the inlet 170 to pass the dilute sodium hydroxide to the left chamber. The pump tube 142 is coupled to the inlet 174 to pass the dilute sulphric acid to the right chamber.

With a cavity length of about 36 inches, width and depth of ¼" each, and with resin impregnated membranes, I have found a 0.2% solution of NaOH, together with a small quantity of a wetting agent, such as "Tween," 10 drops per liter; and 0.2% $H_2SO_4$ and a similar quantity of wetting agent; at a current flow of 0.8 to 1.0 ampere at 110 volts to be effective. As the effluent passes up through the central chamber, the highly charged salt ions from the buffer solution migrate through the membranes. If a buffer solution of sodium acetate-citrate was used, the sodium cations will migrate through the cation exchange membrane 184 towards the cathode 188, while the acetate and citrate anions will migrate through the anion exchange membrane 182 towards the anode 186. The outlets 176 and 180 are coupled to suitable pumps, not shown, to pass the continuous flows of electrolytes out of the left and right chambers. The outlet 178 is coupled by a conduit 190 to a fraction collection apparatus 192. By the time the effluent has passed through the length of the cavity 166 it is substantially free of the ions of the buffer solution.

The fraction collection apparatus 192 may be of the type shown in the Gorham patent, U.S. 2,604,248, issued July 22, 1952, and comprises a rotating carrier 194 supporting a plurality of containers 196. An intermittent rotating means 198 periodically rotates an empty container below a dispensing tube 200 which is coupled to the conduit 190. Thus a predetermined fraction of the effluent from the chromatograph column is collected seriatim in each container. The quantity of effluent passing into each container is in phase with the subportion of effluent being analyzed in the flow cells. If an in-phase relation is not required, the delay coil 136 may be omitted, as there will still be a direct relation between the series of containers and the chart provided by the recorder. If a fresh container is advanced every ten minutes, then ten-minute increments may be advantageously printed along the abscissa of the recorder chart. The chart may be visually inspected to determine which of the series of containers received fractions of the effluent which are of interest.

These fractions are already desalted and may be further processed directly.

The provision for desalting the effluent which is transmitted to the fraction collector for subsequent analysis, and certain other subject matter shown or described but not claimed herein are claimed in the United States application of Leonard T. Skeggs and George N. Catravas, my attorney's docket No. 936, assigned to the assignee of my present application.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea of principles of this invention within the scope of the appended claims.

What I claim is:

1. Apparatus for determining the relative sizes of a plurality of different organic molecules, each appearing in a fraction of a continuous liquid stream comprising: first means for dividing the liquid stream into a first substream and a second substream; second means coupled to said first means for receiving the first substream therefrom and for continuously hydrolyzing the first substream; third means coupled to said second means for receiving the hydrolyzed first substream and for continuously reacting the hydrolyzed first substream with a color forming reagent; fourth means coupled to said third means for receiving the color reacted first substream and for continuously measuring the light transmission of the color reacted first substream and for providing a first signal responsive thereto; fifth means coupled to said fourth means for receiving and for recording the first signal; sixth means coupled to said first means for receiving the second substream therefrom and for continuously reacting the second substream with the color forming reagent; seventh means coupled to said sixth means for receiving the color reacted second substream and for continuously measuring the light transmission of the color reacted second substream and for providing a second signal responsive thereto; and eighth means coupled to said seventh means for receiving the second signal and for recording the second signal in phase with the first signal.

2. Apparatus for determining the relative sizes of a plurality of different peptides, each appearing in a fraction of a continuous liquid stream comprising: first means for dividing the liquid stream into a first substream and a second substream; second means coupled to said first means for receiving the first substream therefrom and for continuously alkali hydrolyzing the first substream; third means coupled to said second means for receiving the hydrolyzed first substream and for continuously ninhydrin reacting the hydrolyzed first substream; fourth means coupled to said third means for receiving the ninhydrin reacted first substream and for continuously measuring the light transmission of the ninhydrin reacted first substream and for providing a first signal responsive thereto; fifth means coupled to said fourth means for receiving and for recording the first signal; sixth means coupled to said first means for receiving the second substream therefrom and for continuously ninhydrin reacting the second substream; seventh means coupled to said sixth means for receiving the ninhydrin reacted second substream and for continuously measuring the light transmission of the ninhydrin reacted second substream and for providing a second signal responsive thereto; and eighth means coupled to said seventh means for receiving the second signal and for recording the second signal in phase with the first signal.

3. Apparatus for determining the relative sizes of a plurality of different peptides, each appearing in a fraction of a continuous liquid stream comprising: first means for dividing the liquid stream in a first substream and a second substream; second means coupled to said first means for receiving the first substream therefrom and for continuously alkali hydrolyzing the first substream; third means coupled to said second means for receiving the hydrolyzed first substream and for continuously ninhydrin reacting the hydrolyzed first substream; fourth means coupled to said third means for receiving the ninhydrin reacted first substream and for continuously measuring the light transmission of the ninhydrin reacted first substream and for continuously providing a first analogue signal responsive thereto; fifth means coupled to said fourth means for receiving and for continuously recording the first analogue signal; sixth means coupled to said first means for receiving the second substream therefrom and for continuously ninhydrin reacting the second substream; seventh means coupled to said sixth means for receiving the ninhydrin reacted second substream and for continuously measuring the light transmission of the ninhydrin reacted second substream and for continuously providing a second analogue signal responsive thereto; and said fifth means also coupled to said seventh means for receiving and for continuously recording the second analogue signal in phase with the first analogue signal.

4. Apparatus for determining the relative sizes of a plurality of different peptides, each appearing in a fraction of a continuous liquid stream, comprising: first means for dividing the liquid stream into concurrently phased first, second and third substreams; second means coupled to said first means for receiving the first substream therefrom and for continuously alkali hydrolyzing the first substream; third means coupled to said second means for receiving the hydrolyzed first substream and for continuously ninhydrin reacting the hydrolyzed first substream; fourth means coupled to said third means for receiving the ninhydrin reacted first substream and for continuously providing a first analogue signal responsive thereto; fifth means coupled to said fourth means for receiving and for continuously recording the first analogue signal in a given phase relation to the passage of the liquid stream through said first means; sixth means coupled to said first means for receiving the second substream therefrom and for continuously ninhydrin reacting the second substream; seventh means coupled to said sixth means for receiving the ninhydrin reacted second substream and for continuously measuring the light transmission of the ninhydrin reacted second substream and for continuously providing a second analogue signal responsive thereto; and said fifth means also coupled to said seventh means for receiving and for continuously recording the second analogue signal in the given phase relation to the passage of the liquid stream through said first means and in isochronism with the first analogue signal.

5. Apparatus for determining the relative sizes of a plurality of different peptides, each appearing in a fraction of a continuous liquid stream, comprising: first means for dividing the liquid stream into concurrently phased first, second and third substreams; second means coupled to said first means for receiving the first substream therefrom and for continuously alkali hydrolyzing the first substream; third means coupled to said second means for receiving the hydrolyzed first substream and for continuously ninhydrin reacting the hydrolyzed first substream; fourth means coupled to said third means for receiving the ninhydrin reacted first substream and for continuously providing a first analogue signal responsive thereto; fifth means coupled to said fourth means for receiving and for continuously recording the first analogue signal in a given phase relation to the passage of the liquid stream through said first means; sixth means coupled to said first means for receiving the second substream therefrom and for continuously ninhydrin reacting the second substream; seventh means coupled to said sixth means for receiving the ninhydrin reacted second substream and for continuously measuring the light transmission of the ninhydrin reacted second substream and for continuously providing a second analogue signal responsive thereto; said fifth means also coupled to said seventh means for receiving and for continuously recording the second analogue signal in the given phase relation to the passage of the liquid stream through said first means and in isochronism with the first analogue signal; and eighth means coupled to said first means for receiving the third substream and for serially storing fractions of the third substream in phased relation to the passage of the liquid stream through said first means; whereby each stored fraction of the third substream is correlated with those portions of the first and second analogue signals which resulted from the processing of the identic fractions of the first and second substreams.

6. A method of determining the relative sizes of a plurality of different peptides, each appearing in a fraction of a continuous liquid stream, comprising: continuously dividing the liquid stream into a first and second substream; continuously alkali hydrolyzing and ninhydrin reacting the first stream; continuously measuring the light transmission of the reacted first substream and recording the measurement as a first signal level varying with and having a given chronological relation to the passage of the stream at division; continuously ninhydrin reacting the second substream; continuously measuring the light transmission of the reacted second substream and recording the measurement as a second signal level varying with time and having the same chronological relation to the passage of the stream at division as the first signal; and comparing isochronal portions of the first and second signals.

7. A method of determining the relative sizes of a plurality of different peptides, each appearing in a fraction of a continuous liquid stream, comprising: continuously dividing the liquid stream into a continuous first, second and third substream; continuously alkali hydrolyzing and ninhydrin reacting the first substream; continuously measuring the light transmission of the reacted first substream and recording this measurement as a first signal level varying with time and having a given chronological relation to the passage of the stream at division; continuously ninhydrin reacting the second substream; continuously measuring the light transmission of the reacted second substream and recording this measurement as a second signal level varying with time and having the same chronological relation to the passages of the stream at division as the first signal; continuously storing the third substream by collecting and storing fractions thereof seriatim, the duration of the interval of the collection of each fraction having another given chronological relation to the passage of the stream at division; and comparing the area under the first recorded signal level with the area under the isochronal second recorded signal level for the interval equivalent to a stored fraction of the third substream.

8. A method of analyzing a plurality of different peptides, each appearing in a fraction of a continuous liquid stream, comprising: mixing the continuous peptide stream with a continuous stream of alkali having a concentration in the range of 3 to 4 normal; heating the continuous stream of peptide and alkali over an interval of its flow to hydrolyze the peptides; reacting the continuous stream of hydrolyzed peptides with a continuous stream of color producing reagent; and continuously measuring the optical density of the stream of color producing reagent reacted hydrolyzed peptides.

9. A method of analyzing a plurality of different peptides, each appearing in a fraction of a continuous liquid stream, comprising: mixing the continuous peptide stream with a continuous stream of alkali having a concentration in the range of 3.5 normal; heating the continuous stream of peptide and alkali over an interval of the flow to hydrolyze the peptides; reacting the continuous stream of hydrolyzed peptides with a continuous stream of color producing reagent; and continuously measuring the optical density of the stream of color producing reagent reacted hydrolyzed peptides.

10. A method of analyzing a plurality of different peptides, each appearing in a fraction of a continuous liquid stream, comprising: mixing the continuous peptide stream with a continuous stream of alkali having a concentration in the range of 3 to 4 normal; heating the continuous stream of peptide and alkali over an interval of its flow at a temperature of about 95° C. to hydrolyze the peptides; reacting the continuous stream of hydrolyzed peptides with a continuous stream of color producing reagent; and continuously measuring the optical density of the stream of color providing reagent reacted hydrolyzed peptides.

11. A method of analyzing a plurality of different peptides, each appearing in a fraction of a continuous liquid stream, comprising continuously dividing the liquid stream into a continuous first and second substream; mixing the continuous first peptide substream with a continuous stream of alkali having a concentration in the range of 3 to 4 normal; heating the continuous stream of peptide and alkali over an interval of its flow to hydrolyze the peptides; reacting the continuous stream of hydrolyzed peptides with a continuous stream of a color producing reagent; continuously measuring and recording the optical density of the stream of color producing reagent reacted hydrolyzed peptides; continuously storing the second substream by collecting and storing fractions thereof seriatim, the duration of the interval of the collection of each fraction having a given chronological relation to the passage of the stream at division; and inspecting the recorded measurement and selecting stored fractions in response thereto.

12. A method of analyzing a plurality of different peptides, each appearing in a fraction of a continuous liquid stream, comprising: continuously dividing the liquid stream into a continuous first and second substream; mixing the continuous first peptide substream with a continuous stream of alkali having a concentration of substantially 3.5 normal; heating the continuous stream of peptide and alkali at a temperature of substantially 100° C. over an interval of its flow to hydrolyze the peptides; reacting the continuous stream of hydrolyzed peptides with a continuous stream of a color producing reagent; continuously measuring and recording the optical density of the stream of color producing reagent reacted hydrolyzed peptides; continuously storing the second substream by collecting and storing fractions thereof seriatim, the duration of the interval of the collection of each fraction having a given chronological relation to the passage of the stream at division; and inspecting the recorded measurement and selecting stored fractions in response thereto.

References Cited
UNITED STATES PATENTS 3,074,784   1/1963   Ferrari _____ 23—253

JOSEPH SCOVRONEK, *Acting Primary Examiner.*

R. E. SERWIN, *Assistant Examiner.*